Figure 1:
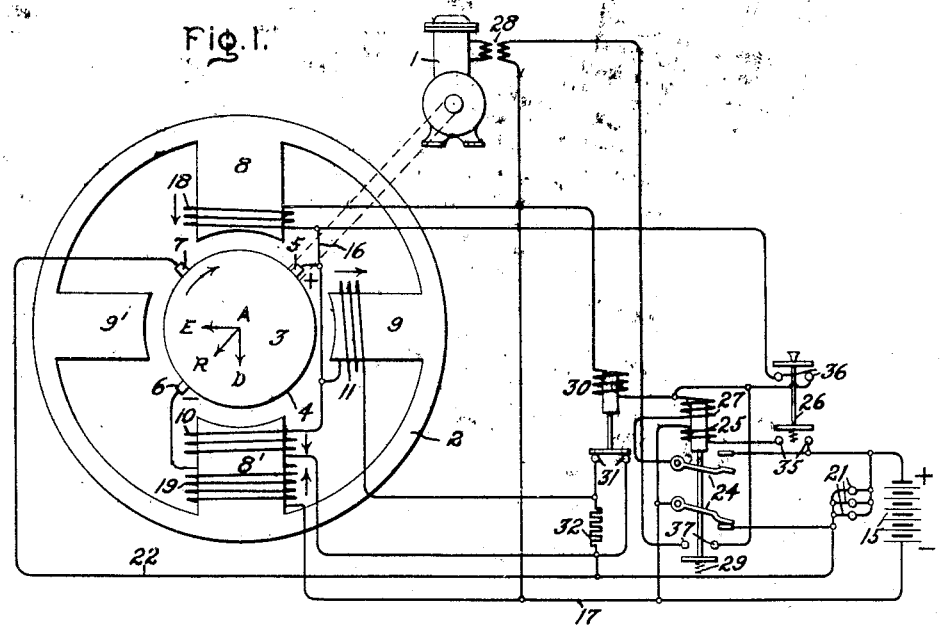

BEST AVAILABLE COPY

R. STECK.
ELECTRICAL SYSTEM.
APPLICATION FILED OCT. 26, 1920.

1,426,923.

Patented Aug. 22, 1922.

Inventor:
Robert Steck,
by Albert G. Davis
His Attorney.

a # UNITED STATES PATENT OFFICE.

ROBERT STECK, OF FORT WAYNE, INDIANA, ASSIGNOR TO GENERAL ELECTRIC COMPANY, A CORPORATION OF NEW YORK.

ELECTRICAL SYSTEM.

1,426,923.

Specification of Letters Patent.

Patented Aug. 22, 1922.

Application filed October 26, 1920. Serial No. 419,687.

*To all whom it may concern:*

Be it known that I, ROBERT STECK, a citizen of the United States, residing at Fort Wayne, county of Allen, State of Indiana, have invented certain new and useful Improvements in Electrical Systems, of which the following is a specification.

My invention relates to electrical systems and particularly to systems in which a plurality of translation circuits are supplied with electrical energy from a single dynamo electric machine.

My invention is an improvement on the electrical system shown in my copending application, Serial No. 419,689 filed October 26, 1920, and assigned to the same assignee as this application. In my copending application there is disclosed an electrical system commonly known as a farm lighting system which comprises a power and lighting circuit, a storage battery adapted to supply energy to said circuit, an internal combustion engine and a dynamo electric machine arranged to operate as a motor to crank the engine and to be driven by the engine as a generator to supply current to charge the battery and to supply current to the power and lighting circuit while the battery is being charged.

In the system shown in my above-mentioned copending application the dynamo electric machine while arranged and constructed so that the copper loss in the field windings is relatively small when operating as a generator, has a relatively small cranking torque while operating as a motor and a complicated control equipment is necessary to change the connections in order to increase its cranking torque when being operated as a motor.

One object of my invention is to provide in an electrical system of the type referred to, a dynamo electric machine arranged and constructed so that a very simple control equipment is required in order that it may develop a large torque while operating as a motor, so that it will have a small copper loss while operating as a generator, and so that the voltage impressed upon the power and lighting circuit remains constant, irrespective of the load upon this circuit and the amount of current being supplied to the battery, and the voltage impressed upon the battery terminals, which is higher than that impressed across the power and lighting circuit, varies so as to give the battery a suitable taper charge.

Another object of my invention is to provide in an electrical system of the type referred to, an arrangement whereby the voltage impressed across the battery terminals is automatically varied when the load connected to the power and lighting circuit exceeds a predetermined value, while the battery is being charged so that the battery and the generator will operate in parallel to supply current to the power and lighting circuit.

My invention will be better understood from the following description taken in connection with the accompanying drawings and its scope will be pointed out in the appended claims.

Figure 2:
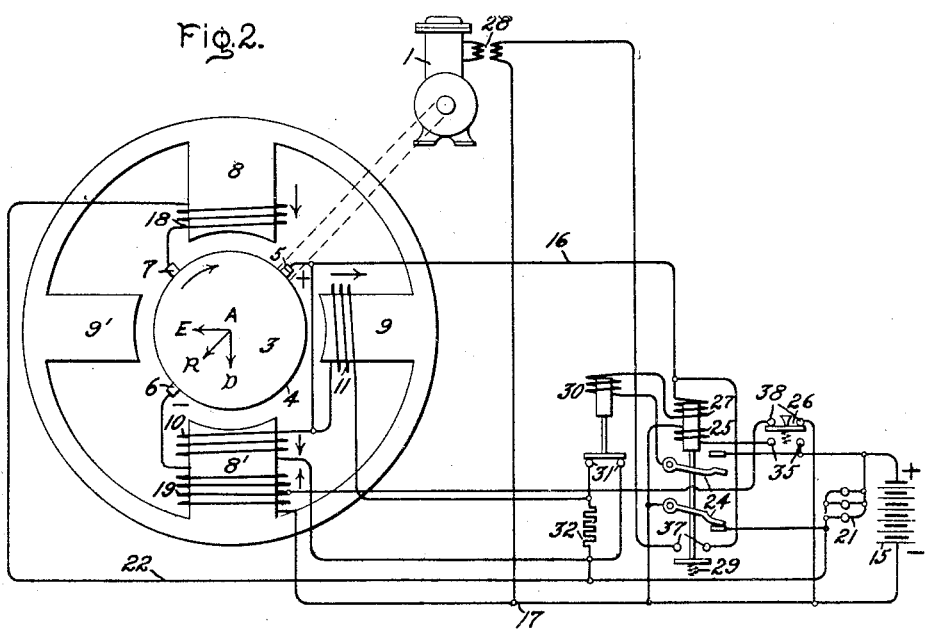

Referring to the drawings, Fig. 1 illustrates one embodiment of my invention; and Fig. 2 illustrates a modification of the arrangement shown in Fig. 1.

Referring to Fig. 1 of the drawings, 1 represents a prime mover, such as any of the well known types of internal combustion engines connected to a dynamo electric machine 2, which is adapted to operate either as a generator or as a motor. This machine is provided with an armature 3 having a two pole armature winding wound thereon, a commutator 4 on which bear the brushes 5 and 6, which are spaced 180 electrical degrees apart, and a third brush 7 located between the 180 degree brushes, and a field magnet structure having two sets of mechanical field poles 8-8' and 9-9' surrounding the armature 3.

It will be observed that the number of mechanical field poles is twice the number of poles of the armature winding and this relation may be broadly expressed by saying that the machine has an $n$ pole armature and a field structure having $2n$ mechanical poles. The mechanical field poles are arranged in two sets with an equal number of poles in each set, and so that certain adjacent poles of the sets are of like polarity. In the arrangement shown, the poles 8—8' are excited by the exciting winding 10 which is connected across the brushes 5 and 7 and the field poles 9—9' are excited by the exciting winding 11 which is also connected across the brushes 5 and 7. These windings are so arranged that the poles 8 and 9' and the poles 8' and 9 are of like polarity. In order to simplify the drawings, I have shown the windings on a set of poles as being wound on only one pole of the set but in the actual machine the windings are preferably equally distributed on all the poles of a set.

The brushes 5, 6 and 7 and the sets of poles 8—8' and 9—9' are so arranged with respect to each other that the voltage between brushes 5 and 7 depends upon the flux in the set of poles 8—8' only, and the voltage between the 180 degree brushes 5 and 6 depends upon the flux in both sets of poles. Since the poles 8—9' are of like polarity and the poles 8' and 9 are of like polarity, the voltage between brushes 5 and 6 is equal to the voltage developed between the brushes 5 and 7 plus the voltage developed between the brushes 7 and 6. The armature winding is so arranged that when the armature 3 is rotated in the direction indicated by the arrow, the brush 5 is the positive brush and the current flowing through the armature winding between brushes 5 and 6 produces a cross-magnetizing magnetomotive force AR which is substantially in line with the brushes 5 and 6 and which may be resolved into two components, AD which is in the same direction as the magneto-motive force of the exciting winding 10 on the set of poles 8—8' and AE which is in opposition to the magnetomotive force of the exciting winding 11 on the set of poles 9—9'. The current flowing through the armature winding between brushes 5 and 7 only also produces a cross-magnetizing magnetomotive force in line with the component AE of the cross-magnetizing magnetomotive force AR. The polar arc embraced by the set of poles 8—8' is considerably greater than that embraced by the set of poles 9—9', as the voltage required to be developed between the brushes 5 and 7 is considerably greater than that required to be developed between brushes 7 and 6.

15 represents a storage battery which is adapted to be charged with current supplied from the machine 2 through conductors 16 and 17 which are connected to the brushes 5 and 6 respectively. A field winding 18 on the set of poles 8—8' is connected in series with the conductor 16 and is arranged to produce a magnetomotive force in the same direction as the magnetomotive force of the exciting winding 10 when the machine is operating as a generator. A field winding 19 which is connected in series with the conductor 17 is also provided on the set of poles 8—8' and is arranged to produce a magnetomotive force in opposition to the magnetomotive force of the exciting winding 10 when the machine is operating as a generator.

A power and lighting circuit 21 which requires a substantially constant voltage to be impressed thereon and which is shown as a lamp circuit is connected so as to be supplied with current from the battery 15 when the battery is not being charged and to be supplied with current from the dynamo electric machine 2 through conductors 16 and 22, which are connected to the brushes 5 and 7 respectively, when the battery is being charged. Since the voltage generated between the brushes 5 and 6 is equal to the voltage between the brushes 5 and 7 plus the voltage between the brushes 7 and 6, it will be evident that the voltage impressed upon the power and lighting circuit 21 is less than that impressed upon the battery 15.

In series which the conductor 16, I provide a current responsive device 30 which is adapted to operate when the current through it exceeds a predetermined valve to open a circuit through contacts 31, which are connected to the terminals of a resistance 32 in series with the exciting winding 11 on the set of poles 9—9'.

Any suitable means may be provided for controlling the starting and stopping of the engine 1 and the connections between the battery 15, the power and lighting circuit 21 and the dynamo electric machine 2. The particular arrangement shown comprises an automatic switch 24 having a shunt winding 25, which is adapted to be connected across the battery 15 through contacts 35 of a manually operated starting switch 26, and a series winding 27 connected in series with the conductor 16. The switch 24 in its open position completes a circuit connecting the power and lighting circuit 21 directly across the battery 15. In the closed position of the automatic switch 24 this circuit is broken and the circuits hereinafter described between the brushes 5 and 7 and the power and lighting circuit 21 and between the brushes 5 and 6 and the battery 15 are completed. A circuit for the ignition coil 28 is also completed across the conductors 16 and 17 when the switch 24 is closed. A spring 29 is provided to restore the switch 24 to its open position when the windings 25 and 27 are deenergized. The starting switch 26 is also arranged to complete a circuit through contact 36 in order to short circuit the series field winding 18 and the coil 30 while the machine is operating as a motor.

The operation of the system shown in Fig. 1 is as follows: When the engine is idle, the apparatus occupies the position shown in the drawing and current is supplied from the battery 15 directly to the power and lighting circuit 21 through contacts of the switch 24. When it is desired to run the machine 2 to supply current to charge the battery 15, the starting switch 26 is closed thereby allowing current to flow from the positive side of the battery 15 through contacts 35, the shunt winding 25 of the automatic switch 24 to the negative side of the battery. Switch 24 thereupon closes and completes a circuit from the positive side of the battery 15 through the series winding 27 of the automatic switch 24, contacts 36, conductor 16, brush 5, armature winding of the dynamo electric machine 2, brush 6, series field winding 19, conductor 17, to the negative side of the battery. Current also flows from the positive side of the battery to the positive brush 5 over the circuit above traced then through the field winding 10, and through the field winding 11 and contacts 31, to the conductor 22, then through brush 7, armature winding of the dynamo electric machine, brush 6, field winding 19, conductor 17 to the negative side of the battery. Current also flows from the positive side of the battery, through the power and lighting circuit 21, conductor 22 and then to the negative side of the battery through the circuit above described. Current also flows through the ignition coil 28, the circuit of which is completed through contacts 37 of the automatic switch 24.

Since the series field winding 19 is wound so as to act differentially with the exciting winding 10 when the machine is acting as a generator this winding acts accumulatively with the exciting winding 10 when the machine is acting as a motor. Since the field winding 18 is wound so as to act accumulatively with the exciting winding 10 when the machine is acting as a generator it would act differentially with the exciting winding if it remained connected in series with the conductor 16 while the machine is operating as a motor. Therefore, in order to have a large cranking torque, it is desirable to either short circuit, reverse or change the connections of this field winding in any suitable manner so that it does not tend to decrease the flux in the set of poles 8—8' while the machine is operating as a motor. In the arrangement illustrated, I have shown the starting switch 26 as being arranged to short circuit the field winding 18 through contacts 36 when the switch is in its closed position. It may be desirable not to operate the relay 30 while the machine is operating as a motor, and therefore I have arranged the starting switch so that it short circuits the winding of this relay through contacts 36.

The current flowing through the armature winding, while the machine is operating as a motor, produces a cross magnetizing magnetomotive force in line with the brushes 5 and 6 which is in the opposite direction to the cross-magnetizing magnetomotive force AR, and this cross-magnetizing magnetomotive force may be resolved into two components, one which is in opposition to the magnetomotive force of the exciting winding 10 on the set of poles 8—8', and another component which is in the same direction as the magnetomotive force of the exciting winding 11 on the set of poles 9—9'. The component of the cross-magnetizing magnetomotive force which is in opposition to the magnetomotive force of the exciting winding 10 is more than counterbalanced by the magnetomotive force of the series winding 19. Therefore, it will be seen that the machine acts as an accumulatively wound motor and develops a very high torque for cranking the engine.

When the engine begins to operate the speed of the armature 3 increases and the machine acts as a generator to supply current to the power and lighting circuit 21 and to the battery 15. The voltage developed between the brushes 5 and 7 is impressed upon the power and lighting circuit and the voltage developed between the brushes 5 and 6 which is equal to the voltage developed between brushes 5 and 7 plus the voltage developed between the brushes 6 and 7 is impressed upon the battery 15.

The engine is preferably provided with governing means of any suitable type, whereby the speed thereof remains substantially constant. As soon as the machine 2 begins to operate as a generator current flows through the series winding 27 of the automatic switch so that it acts accumulatively with the shunt winding 25. The starting switch 26, which is held closed until the engine starts, may then be released and the automatic switch will remain in its closed position as long as the current through the coil 27 exceeds a predetermined value. The shunt coil 25 is so designed that the ampere turns thereof exceed the ampere turns of the coil 27 while the battery is supplying current to the machine to operate it as a motor thereby keeping the switch 24 closed during this operation. When the starting switch 26 is released the short circuit around the series field winding 18 and the coil 30 is opened so that all of the current flowing through conductor 16 also flows through the winding 18 and the coil 30.

Since the component AE of the cross-magnetizing magnetomotive force AR due to the battery charging current flowing through the armature winding is in opposition to the magnetomotive force of the exciting winding 11, it will be evident that the flux in the set of poles 9—9' will vary inversely with the battery charging current. Therefore, with the arrangement shown, the voltage impressed across the battery terminals is a minimum at the beginning of the charge when the current input into the battery is large. As the battery becomes charged and the charging current decreases, the voltage developed by the flux in the set of poles 9—9′ increases and, therefore, the voltage impressed across the terminals of the battery increases. Therefore, it will be evident that, with the connections as shown, I am able to give the battery a suitable taper charge without any series field winding on the set of poles 9—9′.

Since the machine runs at a substantially constant speed the flux set up in the set of poles 8—8′ by the exciting winding 10 is substantially constant and therefore the voltage developed between the brushes 5 and 7 remains substantially constant. In order to compensate for the resistance drop in the power and lighting circuit as the load thereof varies, I connect this circuit so that the current supplied thereto flows through the series field winding 18 provided on the set of poles 8—8′ and which acts accumulatively with the exciting winding 10. In order to counterbalance the component AD of the armature cross-magnetizing magnetomotive force AR in line with the set of poles 8—8′ due to the battery charging current, I connect the battery so that the charging current supplied thereto flows through the series field winding 18 and also through the series field winding 19 on the set of poles 8—8′ which acts differentially with the exciting winding 10. By connecting the battery in this manner so that the magnetomotive force of the series field winding 18 is in opposition to the magnetomotive force of the series field winding 19, the number of turns in the series field winding 19 can be made greater than if the battery charging current traversed this winding only. This increase in the number of turns in the winding 19 results in an increase of torque when the machine is being operated as a motor as the winding 19 aids the field winding 10 at that time. The number of turns of the series coil 19 exceeds the number in series field winding 18 by an amount sufficient to balance enough of the component AD of the cross-magnetizing magnetomotive force AR to maintain the voltage between brushes 5 and 7 constant as the battery charging current varies.

As the charge of the battery 15 increases, the current through the series winding 27 of the switch 24 decreases until a point is reached where the spring 29 overpowers the magnetic pull of the winding 27. Switch 24 thereupon opens and disconnects the positive brush from the battery 15 and the power and lighting circuit 21. Switch 24 also opens the circuit of the ignition coil 28 to stop the engine 1 and connects the power and lighting circuit 21 directly across the battery 15 thereby restoring the apparatus to its idle condition.

When the load on the power and lighting circuit is of such a value while the battery is being charged, that the load on the generator exceeds the capacity of the generator it is very desirable to secure multiple operation of the generator and the battery. In order, however, to secure a proper division of load between the battery and generator it is essential that the voltage at the terminals of the two be the same. The machine shown in Fig. 1 is particularly adapted for accomplishing this result because the characteristic of the generator is such that any variation in load on the power and lighting circuit is accompanied by a variation in the current supplied to the battery. This will be evident from the fact that as the load on the power and lighting circuit increases the flux in set of poles 9—9′ decreases due to the cross-magnetizing magnetomotive force produced by the power and lighting current flowing in the armature winding between brushes 5 and 7. Therefore, the voltage impressed on the battery and consequently the charging current decreases as the load on the power and lighting circuit increases. When the load on the power and lighting circuit reaches a certain value, determined by the design of the machine, the flux in the set of poles 9—9′ is zero and no voltage is developed between brushes 6 and 7 of the machine. If the condition of the battery is such at this time that the voltage thereof is equal to the voltage across the terminals 5 and 6, the battery will supply the greater part of any additional load which may be connected to the power and lighting circuit. If, however, the voltage of the battery is lower than that being maintained across the power and light circuit, when the flux in the set of poles 9—9′ is zero, it will be necessary for the load on the power and lighting circuit to increase to a larger value before the battery and generator will operate in multiple to supply current to the power and lighting circuit because it will be necessary to reverse the direction of flux in the set of poles 9—9′ so that sufficient voltage will be generated in the proper direction between brushes 6 and 7 to make the voltage of the battery circuit equal to the voltage being generated between brushes 5 and 7. Therefore, with this arrangement it is possible by sufficiently loading the power and lighting circuit to make the battery operate in multiple with the generator to supply current to power and lighting circuit.

It is desirable, however, to be able to accomplish this parallel operation of the battery and generator at any predetermined load, and I am able to obtain this desired result by means of the relay 30 which has its coil connected in series with the conductor 16 so that all of the current supplied by the generator flows through this coil. The contacts 31 of the relay 30 normally short circuit the resistance 32 which is connected in series with the field winding 11. The relay is so adjusted that until the current supplied by the generator exceeds a predetermined value, the relay does not operate to open the short circuit around the resistance 32. When however the load supplied by the generator exceeds the predetermined value, the relay opens and inserts the resistance in the field 11 whereupon the magnetomotive force of the field winding is so decreased that the battery will supply a portion of the load connected to the power and lighting circuit. Just as soon as the battery begins to discharge, the load on the generator decreases so that relay 30 will close thereby short circuiting the resistance 32 in the circuit of the field winding 11. Thereupon the battery will stop discharging and the current through the coil of the relay will again exceed the predetermined value so that the above cycle of operation is repeated. It will be apparent that the relay 30 will be in a state of constant vibration when the load on power and lighting circuit exceeds the predetermined value and that the time during which the contacts 31 are bridged will depend upon the magnitude of the load. Therefore, it will be evident that by means of the arrangement shown in Fig. 1, I am enabled to obtain the full discharge capacity of the battery in parallel with generator without impairment of the voltage regulation on the power and lighting circuit as the voltage impressed upon the power and lighting circuit is maintained constant in the manner above described. While it is true that the current through the series winding 19 reverses when the battery and generator are operating in multiple, the magnetomotive force of this winding is substantially neutralized by the cross-magnetizing magnetomotive force produced by the battery current flowing through the armature winding between brushes 7 and 6 and therefore the voltage impressed on the power and lighting circuit remains substantially constant.

In the arrangement shown in Fig. 2 which is a modification of the arrangement shown in Fig. 1, I connect the series field winding 18 in series with the conductor 22 instead of in series with the conductor 16 so that the power and lighting current only flows through this winding. By connecting this field winding in this manner, it is not necessary to provide means for changing the connection thereof when the machine is being operated as a motor. The number of turns in this winding is such that the magnetomotive force set up by the power and lighting current flowing through it just compensates for the resistance drop in this circuit.

It is believed that the operation of the arrangement shown in Fig. 2 will be obvious from the description of the operation of the arrangement shown in Fig. 1, and, therefore, a detail description thereof is deemed unnecessary. It will be evident that, with the arrangement shown in this figure, proper voltage regulation on the power and lighting circuit 21 is obtained, as the current therein varies, by means of the series field winding 18 on the set of poles 8—8'. As the battery current varies the proper voltage is maintained on the power and lighting circuit 21 by the combined effect of the series field winding 19 on the set of poles 8—8' and the component AD of the cross-magnetizing magnetomotive force AR in line with this set of poles, the two being in opposition. Proper voltage regulation on the battery circuit is obtained in the same way as in Fig. 1.

With the arrangement shown in this figure the series winding 19 on the set of poles 8—8' acts in opposition to the exciting winding 10 while the machine is operating as a generator and therefore acts accumulatively when the machine is being operated as a motor. Since the number of turns required on the series winding 19 in order to obtain the desired voltage regulation is relatively small, it may be desirable to wind these windings with a relatively larger number of turns so as to increase the torque developed while the machine is acting as a motor and to provide suitable apparatus for short circuiting a portion of these turns while the machine is operating as a generator so as to obtain the desired voltage regulation. In the arrangement shown in Fig. 2, I accomplish this result by means of contacts 38 on the starting switch 26 which are arranged to short circuit a portion of the series field winding 19 when the switch 26 is in its open position. The coil of relay 30 is not short circuited in this figure when the starting switch is closed.

It is apparent that while I have shown and described two modifications of my invention, various other modifications and changes may be made without departing from the spirit of my invention, and therefore I desire to cover in the appended claims all such modifications and changes which fall within the spirit and scope of my invention.

What I claim as new and desire to secure by Letters Patent of the United States, is:

1. An electrical system comprising an inherently regulated self-excited dynamo electric machine having an $n$ pole armature winding and a field structure comprising $2n$ mechanical field poles arranged in two sets with an equal number of poles in each set, certain adjacent poles of the separate sets being arranged to be of like polarity, at least three brushes cooperating with said armature, two of said brushes being spaced substantially 180 electrical degrees apart and arranged with respect to said poles so that the voltage between said brushes is dependent on the flux in both of said sets of poles, the third brush being arranged with respect to said poles so that the voltage between said third brush and one of said 180 degree brushes is dependent on the flux in one only of said sets of poles, a translation circuit connected to said 180 degree brushes, a second translation circuit connected to be supplied at the voltage induced by one of said sets of poles only, an exciting winding for the set of poles last mentioned connected across said second translation circuit, the machine being constructed and arranged so that the current flowing in the armature winding between said 180 degree brushes produces in the set of poles last mentioned a magnetomotive force in the same direction as the magnetomotive force of said exciting winding.

2. An electrical system comprising an inherently regulated self-excited dynamo electric machine having an $n$ pole armature winding and a field structure comprising $2n$ mechanical field poles arranged in two sets with an equal number of poles in each set, certain adjacent poles of the separate sets being arranged to be of like polarity, at least three brushes cooperating with said armature, two of said brushes being spaced substantially 180 electrical degrees apart and arranged with respect to said poles so that the voltage between said brushes is dependent on the flux in both of said sets of poles, the third brush being arranged with respect to said poles so that the voltage between said third brush and one of said 180 degree brushes is dependent on the flux in one only of said sets of poles, a translation circuit connected to said 180 degree brushes, a second translation circuit connected to be supplied at the voltage induced by one of said sets of poles only, an exciting winding for each set of poles, the machine being constructed and arranged so that the current flowing in the armature winding between said 180 degree brushes produces in the set of poles inducing the voltage supplied to said second translation circuit a magnetomotive force in the same direction as the magnetomotive force of the exciting winding therefor, and produces in the other set of poles a magnetomotive force in opposition to the magnetomotive force of the exciting winding therefor.

3. An electrical system comprising an inherently regulated self-excited dynamo electric machine having an $n$ pole armature winding and a field structure comprising $2n$ mechanical field poles arranged in two sets with an equal number of poles in each set, certain adjacent poles of the separate sets being arranged to be of like polarity, at least three brushes cooperating with said armature, two of said brushes being spaced substantially 180 electrical degrees apart and arranged with respect to said poles so that the voltage between said brushes is dependent on the flux in both of said sets of poles, the third brush being arranged with respect to said poles so that the voltage between said third brush and one of said 180 degree brushes is dependent on the flux in one only of said sets of poles, a translation circuit connected to said 180 degree brushes, a second translation circuit connected to be supplied at the voltage induced by one of said sets of poles only, an exciting winding for each of said set of poles connected across said second translation circuit, the machine being constructed and arranged so that the current flowing in the armature winding between said 180 degree brushes produces in the set of poles inducing the voltage supplied to said second translation circuit a magnetomotive force in the same direction as the magnetomotive force of the exciting winding therefor, and produces in the other set of poles a magnetomotive force in opposition to the magnetomotive force of the exciting winding therefor.

4. An electrical system comprising an inherently regulated self-excited dynamo electric machine having an $n$ pole armature winding and a field structure comprising $2n$ mechanical field poles arranged in two sets with an equal number of poles in each set, certain adjacent poles of the separate sets being arranged to be of like polarity, at least three brushes cooperating with said armature, two of said brushes being spaced substantially 180 electrical degrees apart and arranged with respect to said poles so that the voltage between said brushes is dependent on the flux in both of said sets of poles, the third brush being arranged with respect to said poles so that the voltage between said third brush and one of said 180 degree brushes is dependent on the flux in one only of said sets of poles, a translation circuit connected to said 180 degree brushes a second translation circuit connected to be supplied at the voltage induced by one of said sets of poles only, an exciting winding for each of said set of poles, said exciting windings being arranged so that the direction of flux in the sets of poles is such as to cause both sets of poles to induce electromotive forces in the same direction in the armature winding between said 180 degree brushes, the machine being constructed and arranged so that the current flowing in the armature winding between said 180 degree brushes produces in the set of poles inducing the voltage supplied to said second translation circuit a magnetomotive force in the same direction as the magnetomotive force of the exciting winding therefor, and produces in the other set of poles a magnetomotive force in opposition to the magnetomotive force of the exciting winding therefor.

5. An electrical system comprising an inherently regulated self-excited dynamo electric machine having an $n$ pole armature winding and a field structure comprising $2n$ mechanical field poles arranged in two sets with an equal number of poles in each set, certain adjacent poles of the separate sets being arranged to be of like polarity, at least three brushes cooperating with said armature, two of said brushes being spaced substantially 180 electrical degrees apart and arranged with respect to said poles so that the voltage between said bushes is dependent on the flux in both of said sets of poles, the third brush being arranged with respect to said poles so that the voltage between said third brush and one of said 180 degree brushes is dependent on the flux in one only of said sets of poles, a translation circuit connected to said 180 degree brushes, a second translation circuit connected to be supplied at the voltage induced by one of said sets of poles only, an exciting winding for the set of poles last mentioned connected across one of said translation circuits, the machine being constructed and arranged so that the current flowing in the armature winding between said 180 degree brushes produces in the set of poles last mentioned a magnetomotive force in the same direction as the magnetomotive force of said exciting winding, and a winding connected in series with said first mentioned translation circuit and arranged to produce in the set of poles last mentioned a magnetomotive force in opposition to the magnetomotive force of said exciting winding.

6. An electrical system comprising an inherently regulated self-excited dynamo electric machine having an $n$ pole armature winding and a field structure comprising $2n$ mechanical field poles arranged in two sets with an equal number of poles in each set, certain adjacent poles of the separate sets being arranged to be of like polarity, at least three brushes cooperating with said armature, two of said brushes being spaced substantially 180 electrical degrees apart and arranged with respect to said poles so that the voltage between said brushes is dependent on the flux in both of said sets of poles, the third brush being arranged with respect to said poles so that the voltage between said third brush and one of said 180 degree brushes is dependent on the flux in one only of said sets of poles, a translation circuit connected to said 180 degree brushes, a second translation circuit connected to be supplied at the voltage induced by one of said sets of poles only, an exciting winding for the set of poles last mentioned connected across one of said translation circuits, the machine being constructed and arranged so that the current flowing in the armature winding between said 180 degree brushes produces in the set of poles last mentioned a magnetomotive force in the same direction as the magnetomotive force of said exciting winding, and a winding connected in series with said second mentioned translation circuit and arranged to produce in the set of poles last mentioned a magnetomotive force in the same direction as the magnetomotive force of said exciting winding.

7. An electrical system comprising an inherently regulated self-excited dynamo electric machine having an $n$ pole armature winding and a field structure comprising $2n$ mechanical field poles arranged in two sets with an equal number of poles in each set, certain adjacent poles of the separate sets being arranged to be of like polarity, at least three brushes cooperating with said armature, two of said brushes being spaced substantially 180 electrical degrees apart and arranged with respect to said poles so that the voltage between said brushes is dependent on the flux in both of said sets of poles, the third brush being arranged with respect to said poles so that the voltage between said third brush and one of said 180 degree brushes is dependent on the flux in one only of said sets of poles, a translation circuit connected to said 180 degree brushes, a second translation circuit connected to be supplied at the voltage induced by one of said sets of poles only, an exciting winding for each of said set of poles connected across said second translation circuit, the machine being constructed and arranged so that the current flowing in the armature winding between said 180 degree brushes produces in the set of poles inducing the voltage supplied to said second translation circuit a magnetomotive force in the same direction as the magnetomotive force of the exciting winding therefor and produces in the other set of poles a magnetomotive force in opposition to the magnetomotive force of the exciting winding therefor, and a winding connected in series with said first mentioned translation circuit and arranged to produce in the set of poles inducing the voltage supplied to said second translation circuit a magnetomotive force in opposition to the magnetomotive force of the exciting winding therefor.

8. An electrical system comprising an inherently regulated self-excited dynamo electric machine having an $n$ pole armature winding and a field structure comprising $2n$ mechanical field poles arranged in two sets with an equal number of poles in each set, certain adjacent poles of the separate sets being arranged to be of like polarity, at least three brushes cooperating with said armature, two of said brushes being spaced substantially 180 electrical degrees apart and arranged with respect to said poles so that the voltage between said brushes is dependent on the flux in both of said sets of poles, the third brush being arranged with respect to said poles so that the voltage between said third brush and one of said 180 degree brushes is dependent on the flux in one only of said sets of poles, a translation circuit connected to said 180 degree brushes a second translation circuit connected to be supplied at the voltage induced by one of said sets of poles only, an exciting winding for each of said set of poles connected across said second translation circuit, the machine being constructed and arranged so that the current flowing in the armature winding between said 180 degree brushes produces in the set of poles inducing the voltage supplied to said second translation circuit a magnetomotive force in the same direction as the magnetomotive force of the exciting winding therefor, and produces in the other set of poles a magnetomotive force in opposition to the magnetomotive force of exciting winding therefor, and a winding connected in series with said second mentioned translation circuit and arranged to produce in the set of poles inducing the voltage supplied to said second translation circuit a magnetomotive force in the same direction as the magnetomotive force of the exciting winding therefor.

9. An electrical system comprising an inherently regulated self-excited dynamo electric machine having an $n$ pole armature winding and a field structure comprising $2n$ mechanical field poles arranged in two sets with an equal number of poles in each set, certain adjacent poles of the separate sets being arranged to be of like polarity, at least three brushes cooperating with said armature, two of said brushes being spaced substantially 180 electrical degrees apart and arranged with respect to said poles so that the voltage between said brushes is dependent on the flux in both of said sets of poles, the third brush being arranged with respect to said poles so that the voltage between said third brush and one of said 180 degree brushes is dependent on the flux in one only of said sets of poles, a translation circuit connected to said 180 degree brushes a second translation circuit connected to be supplied at the voltage induced by one of said sets of poles only, an exciting winding for each of said set of poles connected across said second translation circuit, said exciting windings being arranged so that the direction of flux in the sets of poles is such as to cause both sets of poles to induce electromotive forces in the same direction in the armature winding between said 180 degree brushes, the machine being constructed and arranged so that the current flowing in the armature winding between said 180 degree brushes produces in the set of poles inducing the voltage supplied to said second translation circuit a magnetomotive force in the same direction as the magnetomotive force of the exciting winding therefor, and produces in the other set of poles a magnetomotive force in opposition to the magnetomotive force of the exciting winding therefor, and a winding connected in series with said first mentioned translation circuit and arranged to produce in the set of poles inducing the voltage supplied to said second translation circuit a magnetomotive force in opposition to the magnetomotive force of the exciting winding therefor.

10. An electrical system comprising an inherently regulated self-excited dynamo electric machine having an $n$ pole armature winding and a field structure comprising $2n$ mechanical field poles arranged in two sets with an equal number of poles in each set, certain adjacent poles of the separate sets being arranged to be of like polarity, at least three brushes cooperating with said armature, two of said brushes being spaced substantially 180 electrical degrees apart and arranged with respect to said poles so that the voltage between said brushes is dependent on the flux in both of said sets of poles, the third brush being arranged with respect to said poles so that the voltage between said third brush and one of said 180 degree brushes is dependent on the flux in one only of said sets of poles, a translation circuit connected to said 180 degree brushes, a second translation circuit connected to be supplied at the voltage induced by one of said sets of poles only, an exciting winding for each of said set of poles connected across said second translation circuit, said exciting windings being arranged so that the direction of flux in the sets of poles is such as to cause both sets of poles to induce electro-motive forces in the same direction in the armature winding between said 180 degree brushes, the machine being constructed and arranged so that the current flowing in the armature winding between said 180 degree brushes produces in the set of poles inducing the voltage supplied to said second translation circuit a magnetomotive force in the same direction as the magnetomotive force of the exciting winding therefor and produces in the other set of poles a magnetomotive force in opposition to the magnetomotive force of the exciting winding therefor, and a winding connected in series with said second mentioned translation circuit and arranged to produce in the set of poles inducing the voltage supplied to said second translation circuit a magnetomotive force in the same direction as the magnetomotive force of the exciting winding therefor.

11. An electrical system comprising an inherently regulated self-excited dynamo electric machine having an $n$ pole armature winding and a field structure comprising $2n$ mechanical field poles arranged in two sets with an equal number of poles in each set, certain adjacent poles of the separate sets being arranged to be of like polarity, at least three brushes cooperating with said armature, two of said brushes being spaced substantially 180 electrical degrees apart and arranged with respect to said poles so that the voltage between said brushes is dependent on the flux in both of said sets of poles, the third brush being arranged with respect to said poles so that the voltage between said third brush and one of said 180 degree brushes is dependent on the flux in one only of said sets of poles, a translation circuit connected to said 180 degree brushes, a second translation circuit connected to be supplied at the voltage induced by one of said sets of poles only, an exciting winding for each of said sets of poles connected across said second translation circuit, said exciting windings being arranged so that the direction of flux in the sets of poles is such as to cause both sets of poles to induce electromotive forces in the same direction in the armature winding between said 180 degree brushes, the machine being constructed and arranged so that the current flowing in the armature winding between said 180 degree brushes produces in the set of poles inducing the voltage supplied to said second translation circuit a magnetomotive force in the same direction as the magnetomotive force of the exciting winding therefor and produces in the other set of poles a magnetomotive force in opposition to the magnetomotive force of the exciting winding therefor, a winding connected in series with said first mentioned translation circuit and arranged to produce in the set of poles inducing the voltage supplied to said second translation circuit a magnetomotive force in opposition to the magnetomotive force of the exciting winding therefor, and a winding connected in series with said second mentioned translation circuit and arranged to produce in the set of poles inducing the voltage supplied to said second translation circuit a magnetomotive force in the same direction as the magnetomotive force of the exciting winding therefor.

12. An electrical system comprising an inherently regulated self-excited dynamo electric machine having an $n$ pole armature winding and a field structure comprising $2n$ mechanical field poles arranged in two sets with an equal number of poles in each set, certain adjacent poles of the separate sets being arranged to be of like polarity, at least three brushes cooperating with said armature, two of said brushes being spaced substantially 180 electrical degrees apart and arranged with respect to said poles so that the voltage between said brushes is dependent on the flux in both of said sets of poles, the third brush being arranged with respect to said poles so that the voltage between said third brush and one of said 180 degree brushes is dependent on the flux in one only of said sets of poles, a translation circuit including a battery connected to said 180 degree brushes, a second translation circuit connected to be supplied at the voltage induced by one of said sets of poles only, an exciting winding for each set of poles, a resistance adapted to be connected in the circuit of one of said exciting windings, and means responsive to an electrical condition of said system for controlling the connection of said resistance in said last mentioned excitation circuit so that the battery and generator can supply energy to said second translation circuit in multiple.

13. An electrical system comprising an inherently regulated self-excited dynamo electric machine having an $n$ pole armature winding and a field structure comprising $2n$ mechanical field poles arranged in two sets with an equal number of poles in each set, certain adjacent poles of the separate sets being arranged to be of like polarity, at least three brushes cooperating with said armature, two of said brushes being spaced substantially 180 electrical degrees apart and arranged with respect to said poles so that the voltage between said brushes is dependent on the flux in both of said sets of poles, the third brush being arranged with respect to said poles so that the voltage between said third brush and one of said 180 degree brushes is dependent on the flux in one only of said sets of poles, a translation circuit including a battery connected to said 180 degree brushes, a second translation circuit connected to be supplied at the voltage induced by one of said sets of poles only, an exciting winding for the set of poles last mentioned, an exciting winding for the other set of poles, a resistance adapted to be connected in series with said last mentioned exciting winding and means responsive to a predetermined current output of said machine for controlling the connection of said resistance in said excitation circuit so that the battery and generator can supply energy to said second translation circuit in multiple.

14. An electrical system comprising an inherently regulated self-excited dynamo electric machine having an $n$ pole armature winding and a field structure comprising $2n$ mechanical field poles arranged in two sets with an equal number of poles in each set, certain adjacent poles of the separate sets being arranged to be of like polarity, at least three brushes cooperating with said armature, two of said brushes being spaced substantially 180 electrical degrees apart and arranged with respect to said poles so that the voltage between said brushes is dependent on the flux in both of said sets of poles, the third brush being arranged with respect to said poles so that the voltage between said third brush and one of said 180 degree brushes is dependent on the flux in one only of said sets of poles, a translation circuit connected to said 180 degree brushes, a second translation circuit connected to be supplied at the voltage induced by one of said sets of poles only, an exciting winding for the set of poles last mentioned, an exciting winding for the other set of poles, a resistance adapted to be connected in series with said last mentioned exciting winding, the machine being constructed and arranged so that the current flowing in the armature winding between the 180 degree brushes produces in said other set of poles a magnetomotive force in opposition to the magnetomotive force of the exciting winding therefor, and means responsive to a predetermined electrical condition of said system for controlling the connection of said resistance in said excitation circuit so that the battery and generator can supply energy to said second translation circuit in multiple.

15. An electrical system comprising an inherently regulated self-excited dynamo electric machine having an $n$ pole armature winding and a field structure comprising $2n$ mechanical field poles arranged in two sets with an equal number of poles in each set, certain adjacent poles of the separate sets being arranged to be of like polarity, at least three brushes cooperating with said armature, two of said brushes being spaced substantially 180 electrical degrees apart and arranged with respect to said poles so that the voltage between said brushes is dependent on the flux in both of said sets of poles, the third brush being arranged with respect to said poles so that the voltage between said third brush and one of said 180 degree brushes is dependent on the flux in one only of said sets of poles, a translation circuit including a battery connected to said 180 degree brushes, a second translation circuit connected to be supplied at the voltage induced by one of said sets of poles only, an exciting winding for the other set of poles, a resistance adapted to be connected in series with said last mentioned exciting winding, said exciting windings being arranged so that the direction of flux in the sets of poles is such as to cause both sets of poles to induce voltages in the same direction in the armature winding between said 180 degree brushes, the machine being constructed and arranged so that the current flowing in the armature winding between the 180 degree brushes produces in said other set of poles a magnetomotive force in opposition to the magnetomotive force of the exciting winding therefor, and means responsive to a predetermined electrical condition of said system for controlling the connection of said resistance in said exciting circuit so that said battery and generator can supply energy to said second translation circuit in multiple.

16. An electrical system comprising an inherently regulated self-excited dynamo electric machine having an $n$ pole armature winding and a field structure comprising $2n$ mechanical field poles arranged in two sets with an equal number of poles in each set, adjacent poles of separate sets being arranged to be of like polarity, at least three brushes cooperating with said armature, two of said brushes being spaced substantially 180 electrical degrees apart and arranged with respect to said poles so that the voltage between said brushes is dependent on the flux in both of said sets of poles, the third brush being arranged with respect to said poles so that the voltage between said third brush and one of said 180 degree brushes is dependent on the flux in one only of said sets of poles, a translation circuit including a battery connected to said 180 degree brushes, a second translation circuit connected to be supplied at the voltage induced by one of said sets of poles only, an exciting winding for the set of poles last mentioned, an exciting winding for the other set of poles, said exciting windings being arranged so that the direction of flux in the sets of poles is such as to cause both sets of poles to induce voltages in the same direction in the armature winding between said 180 degree brushes, and means responsive to a predetermined electrical condition of said system for varying the excitation of said other set of poles so that said battery and generator can supply energy to said second translation circuit in multiple.

17. An electrical system comprising an inherently regulated self-excited dynamo electric machine having an $n$ pole armature winding and a field structure comprising $2n$ mechanical field poles arranged in two sets with an equal number of poles in each set, adjacent poles of separate sets being arranged to be of like polarity, at least three brushes cooperating with said armature, two of said brushes being spaced substantially 180 electrical degrees apart and arranged with respect to said poles so that the voltage between said brushes is dependent on the flux in both of said sets of poles, the third brush being arranged with respect to said poles so that the voltage between said third brush and one of said 180 degree brushes is dependent on the flux in one only of said sets of poles, a translation circuit including a battery connected to said 180 degree brushes, a second translation circuit connected to be supplied at the voltage induced by one of said sets of poles only, an exciting winding for the set of poles last mentioned, an exciting winding for the other set of poles, said exciting windings being arranged so that the direction of flux in the sets of poles is such as to cause both sets of poles to induce voltages in the same direction in the armature winding between said 180 degree brushes, said machine being constructed and arranged so that the current flowing in the armature winding between said 180 degree brushes produces in said other set of poles a magnetomotive force in opposition to the magnetomotive force of the exciting winding therefor, and means responsive to a predetermined electrical condition of said system for varying the excitation of said last mentioned set of poles so that the battery and generator can supply energy to said second translation circuit in multiple.

In witness whereof, I have hereunto set my hand this twenty-third day of October, 1920.

ROBERT STECK.